UNITED STATES PATENT OFFICE.

CHARLES CATLETT, OF STAUNTON, VIRGINIA.

CEMENTITIOUS COMPOSITION AND METHOD OF PREPARING SAME.

1,308,932. Specification of Letters Patent. Patented July 8, 1919.

No Drawing. Application filed September 23, 1918. Serial No. 255,390.

*To all whom it may concern:*

Be it known that I, CHARLES CATLETT, a citizen of the United States, residing at Staunton, county of Augusta, and State of Virginia, have invented certain new and useful Improvements in Cementitious Compositions and Methods of Preparing Same; and I do hereby declare the following to be a full, clear, and exact description of the invention, such as will enable others skilled in the art to which it appertains to make and use the same.

This invention relates to cementitious compositions and methods of preparing same; and it relates more particularly to the treatment of Portland cement, or of mortars and concrete mixtures containing Portland cement, for the purpose of regulating and controlling the hardening and time strengths thereof.

It has been proposed heretofore to add calcium chlorid to Portland cement concrete mixtures and the like for the purpose of increasing the early time strengths of the concrete after setting or, in other words, of hastening the final hardening thereof. The use of calcium chlorid for this purpose is open to certain practical objections, however, among which may be mentioned the fact that calcium chlorid is difficult to handle on account of its excessive deliquescence, and the more important fact that there is always danger of adding calcium chlorid in excess of the free lime present in the cement, thereby causing the cement to absorb moisture and to become caked.

It is the principal object of the present invention to avoid the difficulties above noted and to attain certain new and desirable results in regulating and controlling the hardening and early time strengths of cement, especially Portland cement, and mixtures thereof. Another object of the invention is to provide novel hydraulic cement compositions or mixtures useful to employ in practising the invention.

Speaking generally, I have found that the addition of comparatively small percentages of an oxysalt (or basic salt), or compositions containing the same, and particularly oxysalt compounds of the earth metals, to cement and to mixtures thereof, has a marked effect in increasing the early time strengths substantially. In particular, the addition of oxychlorid of calcium to Portland cement and mixtures thereof has been found to produce all the good effects produced by calcium chlorid *per se*, but in greater degree and unaccompanied by the undesirable effects apt to result from the use of calcium chlorid. Where the character of the oxysalt permits, the same may be added to and incorporated with the cement itself, forming a novel pulverulent cementitious composition which, upon mixing with water, and optionally with other materials required to make a mortar or concrete, will provide a plastic mass developing higher early time strengths than mixtures not containing the added oxysalt, but otherwise identical therewith.

The foregoing objects and features of the invention, as well as others appearing hereinafter, will be best understood from the following description of typical illustrative embodiments of the broad principles involved.

For the sake of illustration, a specific example will be described in which a calcium oxychlorid composition is employed as the regulating and controlling agent incorporated with Portland cement alone, either wet or dry, or incorporated in mortar and concrete mixtures containing Portland cement. Oxysalt compositions of the character herein contemplated, and calcium oxychlorid compositions in particular, which are especially advantageous for the purposes of the present invention, are described in my co-pending application Serial No. 233,564, filed May 9, 1918. The said oxysalt compositions described in said prior application are in pulverulent condition and substantially dry to the touch. These characteristics render them particularly suitable for admixture in accurately controllable proportions with the cement or cement mixture to be treated. It is to be understood, however, that the present invention is not limited to the employment of this particular type of material, although the use of such material is to be especially recommended in practice.

In a typical instance, a calcium oxychlorid composition which can be used to advantage in practising the present invention, analyzes approximately as follows:

| | |
|---|---|
| Lime (CaO) | 53.00% |
| Calcium chlorid | 31.90% |
| Magnesia (MgO), etc | 1.10% |
| Water | 14.00% |
| | 100.00% |

It is to be understood that in the foregoing anaylsis, no attempt has been made to indicate the exact form in which the various constituents named may be present. Apparently they are present mainly in the form of a hydrated oxychlorid of calcium or a mixture of several hydrated oxychlorids of calcium and magnesium, accompanied by more or less hydrated lime and magnesia. For the sake of convenience, the chlorin content is given in terms of calcium chlorid, although it is probable that calcium chlorid does not normally exist as such in the composition. This particular composition can be made by mixing 100 parts of a high calcium commercial ground quick lime with 60 parts of commercial calcium chlorid ($75\%\text{CaCl}_2$) and 50 parts of water, all parts by weight, under conditions yielding a hard but porous and more or less friable mass, which is sufficiently dry after standing a day or two to be ground up or otherwise reduced to a powder preferably fine enough to pass 100 mesh. A composition of this character is substantially dry and may be kept for a long time in ordinary closed containers without substantial change, being practically stable under normal conditions of exposure to atmosphere. Upon treatment with excess of water, the oxychlorid composition breaks down rather rapidly, yielding calcium chlorid and calcium hydrate, or at any rate conducting itself in a manner indicating such attention. Decomposability by water to a greater or less extent is most desirably characteristic of oxysalt compositions suitable for the purpose of the invention. Oxychlorid compositions having analyses differing from the specific example given, but also suitable for use in the present invention, are readily obtainable by employing different proportions of the raw materials. For present purposes, oxychlorid compositions containing an amount of chlorin corresponding to from 25 to 35 per cent. $\text{CaCl}_2$ are particularly desirable, but these limits are not restrictive.

Thus, a dry pulverulent calcium oxychlorid composition of the type above specified can be advantageously added in comparatively small proportions to Portland cement, or to mortars and concrete mixtures containing Portland cement. Cement mixtures thus modified are found to be much more plastic with the same percentage of water. There is no marked change in the setting time, as such is commonly determined, nor is there any substantial change in long time strength tests; but the early time strengths are considerably increased, and this is obviously highly important for many purposes, such as road building, for example. Moreover, the material is less injuriously affected by low temperatures than are cement mixtures of the usual kind.

Assuming for example, the use of a calcium oxychlorid composition of the specific analysis above given, for the purpose of modifying a Portland cement mortar or concrete, amounts of said composition equal to from 1% to 6% by weight may be used to replace an equal amount of Portland cement, while in practice as little as from 1% to 3% has been found to give excellent results. Higher percentages, ranging even up to 9% or 10%, for example, may be used, such an addition having an available or hypothetical calcium chlorid content of from about 3 to 3.5 per cent.; but ordinarily such large proportions are not necessary. Some Portland cements respond more fully than others, and this determines to some extent the percentage of the oxysalt composition to be added, as does also, of course, the analysis of the composition itself. Its action in modifying the character of the cement mixture is not thoroughly understood, but it may perhaps function in some way as a catalytic or assistant in furthering and accelerating the reactions involved in the hardening process after the cement has received its set. At all events, the effect produced on the early time strengths is very marked and unmistakable. In actual comparative tests, mixtures of the well known Alpha Portland cement treated in accordance with the invention, showed in two days a strength equal to the 7 day strength of ordinary mixtures; while maximum strength, equal to that of ordinary mixtures, was attained in 7 days as against the usual 28 days.

It is to be understood that the foregoing statements as to recommended percentages of compositions to be added, as well as the resultant effects of such additions, apply to neat cement mixtures as well as to concrete, mortar, or other mixtures thereof. Where the oxysalt composition is to be added at the place of ultimate use, the ingredients of the mixture are of course worked up with the necessary amount of water to form a mortar or concrete of the proper consistency, which is placed in the usual manner and allowed to receive its initial and final sets and to harden under the conditions usually prevailing in practice. It is to be noted, however, that the oxysalt composition, specifically a calcium oxychlorid composition, may with advantage be incorporated as a modifying ingredient of Portland cement in its dry pulverulent condition as supplied to the trade. For example, the proper proportion of a calcium oxychlorid composition such as that whose analysis is given above, either in pulverulent form or not, may be added to Portland cement clinker and the mixture passed through the usual ball mills or other grinding apparatus to produce a modified Portland cement which will show unusually high early time strengths; or where more convenient or desirable, said calcium oxychlorid composition in powdered form may be added to ground Portland cement clinker and thoroughly mixed therewith to produce a uniform Portland cement material of substantially the same character as that produced by grinding the oxychlorid composition and the cement clinker together.

By whatever specific method calcium oxychlorid is incorporated with cement or a mixture containing cement, the result is that there is always enough lime or magnesia present in the added material to substantially saturate or satisfy the hypothetical calcium chlorid present as indicated by the typical specific analysis above given, and thus to prevent any undesirable action by such calcium chlorid. Furthermore, the effect produced on the early time strengths of cement, cement mortar, cement concrete, etc., by the addition of a oxychlorid composition of the character hereinbefore described, is in excess of and different from what would be expected as the mean or average of the action of the salt and base used separately. For instance, the addition of lime hydrate to standard Portland cement whose set has been regulated by the addition of gypsum tends to slow the set and to reduce somewhat the early time strength. But the addition of such oxychlorid compound directly, results in little change in the setting time of the cement, while giving a greater increase in the short time strengths than results from using the corresponding amount of calcium chlorid alone. A possible explanation of this behavior is that in such a mixture, oxychlorid is continually being decomposed and re-formed, with the nascent chlorid on that account acting more energetically as regards quick "short time" hardening after set; and that ultimately, as the material dries and the hydration is completed, the chlorid finally reacts in some way with the lime to form a relatively stable combination, thus differing from a cement or concrete mixture in which calcium chlorid alone is added without a sufficient amount of free lime present to form such combination. Whether or not this is the correct explanation, the procedure herein recommended produces the desirable results set forth, and the invention is, therefore, to be understood as based primarily on the actual attainment of said results and not on any particular theory of operation. In preparing cement concrete in accordance with the invention, a typical procedure is as follows: To cement, sand, and broken stone, in the proportions usual for cement concrete, is added an oxysalt of the character described, specifically a calcium oxychlorid composition in the form of a fine powder, in such amount that the available salt (calcium chlorid in this instance) hypothetically present shall equal 2½ per cent. of the cement by weight. The materials are mixed together in the usual way, and the water is then added and mixed with the other ingredients in the customary manner. Or the oxychlorid, as a dry powder may be mixed with the cement separately in the proper proportion. This percentage is found to give particularly good results; but the invention is not to be understood as limited to the use of any specific proportion of the oxysalt in this connection, or to any specific procedure in preparing the concrete mixtures. Concrete thus prepared may be used in the usual manner; but it differs noticeably from ordinary concrete, among other desirable characteristics, especially in the distinctly higher early time strengths which it exhibits.

While the use of an oxychlorid compound of calcium has been referred to as a particularly desirable embodiment of the invention, it is to be understood that the invention also contemplates the employment of other oxyhalids of calcium wherever these can be desirably or economically employed to advantage. Furthermore, under certain conditions, the use of mixtures of oxyhalids or other oxysalts of calcium and other alkaline earth and earth metals generally, as distinguished from the use of a single oxysalt compound, is sometimes desirable, especially where such mixtures can be economically prepared from industrial wastes or residues of low cost. As an instance of this may be noted the use of an oxysalt composition prepared by adding an excess of lime to natural brines or to bitterns, with production of mixed oxyhalids, sulfates, etc. of calcium, magnesium, etc. Furthermore, while reference has been more particularly made to the use of calcium oxysalt compositions, the invention in its broader aspects extends to the use of oxysalts and mixtures of oxysalts, of other alkaline earth metals, and earth metals (e. g. zinc) generally, in the general procedure herein set forth.

In so far as concerns common subject matter, this application is a continuation in part of my prior application hereinbefore mentioned.

What I claim is:

1. The method of preparing hydraulic cement compositions which comprises intimately commingling with a hydraulic cement, substantially dry material comprising an oxysalt.

2. The method of preparing hydraulic cement compositions capable of developing high early time strengths which comprises incorporating with a hydraulic cement in dry condition, substantially dry material comprising an oxysalt of an earth metal.

3. The method of preparing hydraulic cement compositions capable of developing high early time strengths which comprises incorporating with Portland cement an alkaline earth oxychlorid composition in substantially dry and finely divided condition.

4. The method of preparing hydraulic cement compositions capable of developing high early time strengths which comprises incorporating with Portland cement a pulverulent calcium oxychlorid composition.

5. The method of preparing hydraulic cement compositions which comprises grinding Portland cement clinker with material comprising an oxysalt.

6. The method of preparing hydraulic cement compositions which comprises grinding Portland cement clinker with material comprising an oxychlorid of calcium.

7. The method of preparing hydraulic cement compositions which comprises grinding Portland cement clinker with a relatively small proportion of material comprising an oxychlorid of calcium.

8. The method of preparing hydraulic cement compositions which comprises incorporating with material comprising Portland cement a plurality of oxysalts.

9. The method of preparing hydraulic cement compositions which comprises incorporating with material comprising Portland cement a mixture of oxysalts obtained by treating a natural brine or bittern with lime.

10. As a novel cementitious composition, a substantially dry mixture comprising a hydraulic cement and an oxysalt, both in pulverulent condition and intimately commingled.

11. As a new article of manufacture, a substantially dry pulverulent composition comprising a mixture of a hydraulic cement with material comprising an oxysalt of an earth metal.

12. As a new article of manufacture, a substantially dry pulverulent composition comprising a mixture of Portland cement with an alkaline earth oxychlorid.

13. As a new article of manufacture, a substantially dry pulverulent composition comprising a mixture of Portland cement with a calcium oxychlorid preparation.

14. As a novel cementitious composition, a substantially dry unset mixture comprising Portland cement and an oxysalt composition incorporated therewith, said oxysalt composition constituting the smaller portion by weight of the mixture.

15. As a novel cementitious composition, a substantially dry unset mixture comprising Portland cement and a calcium oxychlorid composition intimately commingled therewith in proportion not substantially exceeding 10 per cent. of the entire mixture, substantially as described.

16. As a novel cementitious composition, a mixture comprising a hydraulic cement and a plurality of oxysalts.

17. As a novel cementitious composition, a mixture comprising Portland cement and a plurality of oxysalts.

18. As a novel cementitious composition, a mixture comprising Portland cement and a mixture of oxysalts obtained by treating a natural brine or bittern with lime.

In testimony whereof I hereunto affix my signature.

CHARLES CATLETT.

Copies of this patent may be obtained for five cents each, by addressing the "Commissioner of Patents, Washington, D. C."